(12) United States Patent
Zhang et al.

(10) Patent No.: US 8,799,607 B2
(45) Date of Patent: Aug. 5, 2014

(54) MEMORY CONTROLLER AND METHOD FOR ACCESSING A PLURALITY OF NON-VOLATILE MEMORY ARRAYS

(75) Inventors: Kevin K. Zhang, Austin, TX (US); Xingyu Li, Shanghai (CN)

(73) Assignee: Freescale Semiconductor, Inc., Austin, TX (US)

( * ) Notice: Subject to any disclaimer, the term of this patent is extended or adjusted under 35 U.S.C. 154(b) by 660 days.

(21) Appl. No.: 13/080,944

(22) Filed: Apr. 6, 2011

(65) Prior Publication Data

US 2012/0096215 A1    Apr. 19, 2012

(30) Foreign Application Priority Data

Oct. 14, 2010   (WO) ................ PCT/CN2010/001609

(51) Int. Cl.
*G06F 12/00*   (2006.01)
(52) U.S. Cl.
USPC ........... 711/168; 711/103; 711/114; 711/150; 711/154; 711/157
(58) Field of Classification Search
None
See application file for complete search history.

(56) References Cited

U.S. PATENT DOCUMENTS

| | | | |
|---|---|---|---|
| 7,167,959 B2 | 1/2007 | Lin | |
| 7,694,026 B2 | 4/2010 | Huffman | |
| 2005/0010717 A1* | 1/2005 | Ng et al. | 711/103 |
| 2005/0144361 A1 | 6/2005 | Gonzalez et al. | |
| 2010/0011137 A1 | 1/2010 | McGowan | |

FOREIGN PATENT DOCUMENTS

WO   2007112555   10/2007

* cited by examiner

*Primary Examiner* — Matthew Bradley
*Assistant Examiner* — Alan Otto
(74) *Attorney, Agent, or Firm* — Daniel D. Hill; James L. Clingan, Jr.

(57) ABSTRACT

A memory controller (16) is used in a system (10) having a main memory (22) and a set of non-volatile memories (26, 32, 38, 44). Each non-volatile memory comprises a plurality of sectors (S0-S28), pages, or other memory unit types. A command is received to write data to the set of non-volatile memories (26, 32, 38, 44). Within the data is identified a grouping of the data that is for writing to sectors in the set of non-volatile memories in which each non-volatile memory of the set of non-volatile memories is to be written and each sector to be written has a corresponding location to be written in all of the other non-volatile memories. Corresponding locations are locations that are in the same location in the sequential order. The grouping of data is written into the set of the non-volatile memories to result in the writing in the non-volatile memories occurring contemporaneously.

20 Claims, 6 Drawing Sheets

MEMORY CONTROLLER AND METHOD FOR ACCESSING A PLURALITY OF NON-VOLATILE MEMORY ARRAYS

BACKGROUND

1. Field

This disclosure relates generally to integrated circuit memories, and more specifically, to a memory controller and method for accessing a plurality of non-volatile memory arrays.

2. Related Art

NAND flash memory has been a dominating choice among the various non-volatile memory types because more NAND flash memory cells can be formed in a given area than, for example, NOR flash memory cells. However, the write speed of a NAND flash memory is relatively slow when compared to the operating speeds of current dynamic random access memories (DRAMs) and central processing units (CPUs).

A typical data processing system may have a number of NAND flash memory integrated circuits, or chips, coupled to a NAND flash controller. A common way to improve the access times of NAND flash memory chips is to "interleave", or provide parallel concurrent access to the multiple NAND flash arrays. However, interleaving accesses to NAND flash memory can be difficult in some systems. For example, some operating systems may be inflexible with respect to sector, or page, size.

Therefore, what is needed is a method to access a NAND flash memory that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
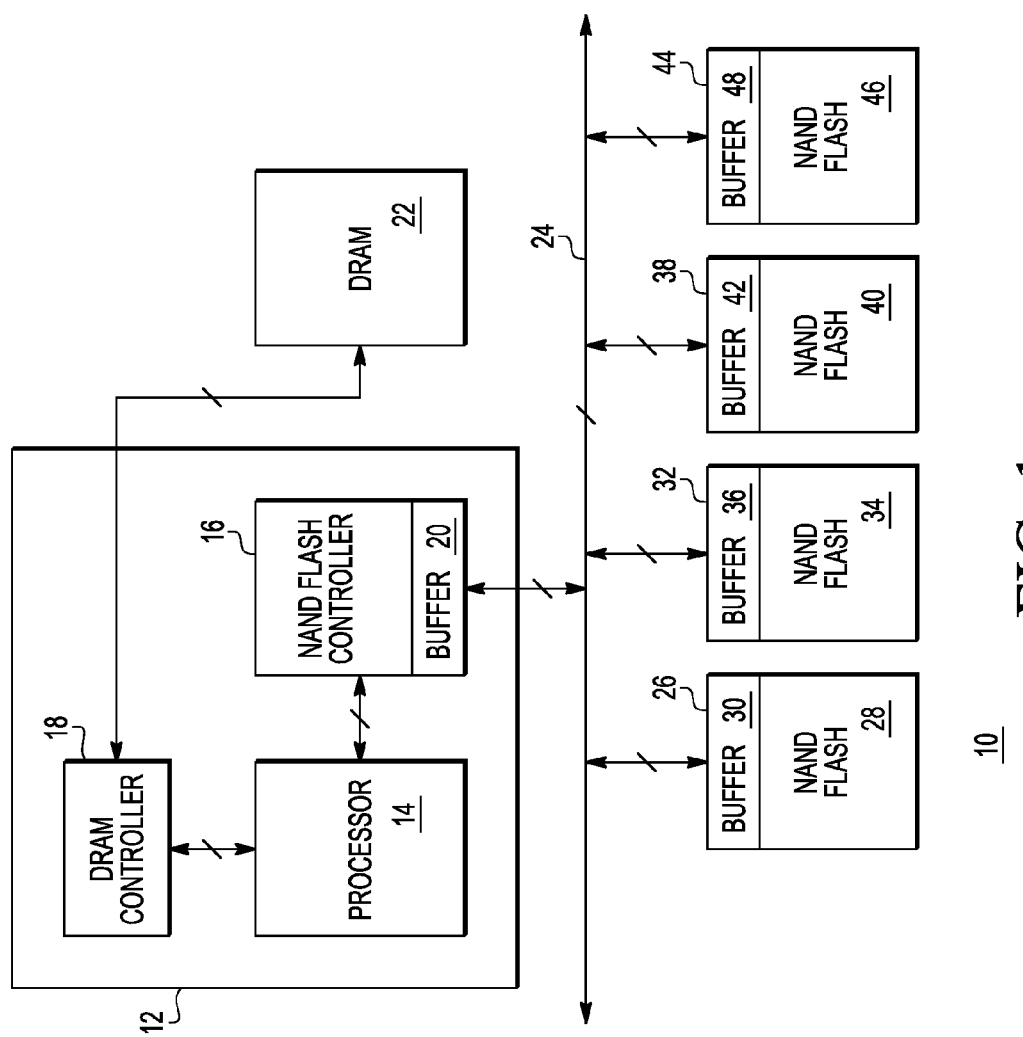
FIG. 1 illustrates, in block diagram form, a data processing system in accordance with an embodiment.

Generally, there is provided, a memory controller and a method for interleaving accesses (write or read) to a plurality of non-volatile memories. An interleaved access is an access, in response to a read or write command, to more than one memory array in a parallel and concurrent manner. In an interleaved access, data to be transferred by a command is distributed across the plurality of non-volatile memory arrays. Some commands cannot be interleaved as first presented. The method includes reorganizing, or changing, at least some commands to one or more different commands so that accesses of the plurality of non-volatile memory arrays can be interleaved instead of being performed serially. The method is especially appropriate for systems having multiple NAND flash memory chips, and allows interleaving in a system that may have inflexible constraints, either hardware or software, regarding for example, sector size of a block device.

In one aspect, there is provided, in a system having a memory controller for accessing a main memory and a set of non-volatile memories, wherein each non-volatile memory of the set of non-volatile memories comprises a plurality of sectors in locations having a sequential order, wherein there is a predetermined number of non-volatile memories in the set of non-volatile memories having a predetermined order beginning with a first non-volatile memory and ending with a last non-volatile memory, a method of operating the memory controller, comprising: receiving a command to write the data to the set of non-volatile memories; identifying within the data a grouping of the data that is for writing to sectors in the set of non-volatile memories in which each non-volatile memory of the set of non-volatile memories is to be written and each sector to be written has a corresponding location to be written in all of the other non-volatile memories, wherein corresponding locations are locations that are in the same location in the sequential order; and writing the grouping of data into the set of the of non-volatile memories to result in the writing in the non-volatile memories occurring concurrently in parallel. The step of identifying may comprise determining if there is a portion of data for writing into the first non-volatile memory. The step of identifying may comprise excluding, from the grouping of the data, data that is for writing into a certain location in the first non-volatile memory in which the corresponding location to the certain location is not to be written in a different non-volatile memory of the set of non-volatile memories from the first non-volatile memory. The step of identifying may comprise excluding a separated portion of data from the grouping of data. The method may further comprise directing the writing of the separated portion at a time exclusive from at time of the writing the grouping of data. The step of identifying may be further characterized by the separated portion of the data having a location prior in sequence to a first location of the grouping of data. The step of identifying may be further characterized by the separated portion of the data having a location subsequent in sequence to a last location of the grouping of data. The step of identifying may comprise: determining if a beginning of the data to be written is for writing into the first non-volatile memory; and if the beginning of the data to be written is for writing into the first non-volatile memory, determining if the number of different sectors to be written is greater than or equal to the number of non-volatile memories in the set of non-volatile memories; wherein, if the number of different sectors to be written is equal to the integer multiple of the number of non-volatile memories in the set of non-volatile memories, then the data is the grouping of data. If the number of different sectors to be written exceeds an integer multiple of the number of non-volatile memories in the set of non-volatile memories by an amount less than the number of non-volatile memories, then the step of identifying may further comprise excluding the portion of the data that exceeds the integer multiple from the grouping of data. The step of identifying may further comprise: if the beginning of the data to be written is not for writing into the first non-volatile memory, determining if any of the data to be written is to be written into the first non-volatile memory; and if any of the data to be written is to be written into the first non-volatile memory, determining if the data to be written into the first non-volatile memory is at a location in which all of the non-volatile memories are to be written; and if the data to be written in the first non-volatile memory is not at a location in which all of the non-volatile memories are to be written, waiting, not exceeding a predetermined time, for a command to write additional data to the set of non-volatile memories before writing the data for the first non-volatile memory.

In another aspect, there is provided, a method for accessing a plurality of non-volatile memories, each of the non-volatile memories having a plurality of sectors, the method comprising: receiving a first command to access the plurality of non-volatile memories for a data transfer of a predetermined number of sectors; determining that executing the first command will not result in the plurality of non-volatile memories being accessed concurrently in parallel; reorganizing the first command into second and third commands, wherein execution of the second and third commands will result in the data transfer of the predetermined number of sectors to or from the plurality of non-volatile memories concurrently in parallel; and executing the second and third commands. The step of determining that executing the first command will not result in the plurality of non-volatile memories being accessed concurrently in parallel may further comprise determining that the predetermined number of sectors is greater than or equal to a total number of non-volatile memories in the plurality of non-volatile memories. The step of receiving the first command to access the plurality of non-volatile memories for the data transfer may further comprise the data transfer being a write operation of the plurality of non-volatile memories. Execution of the second and third commands may result in the data transfer of less than the predetermined number of sectors plus a remainder number of sectors. The remainder number of sectors may be added to a subsequent fourth command.

In yet another aspect, there is provided, a memory control system for use in a system having a main memory and a set of non-volatile memories, wherein each non-volatile memory of the set of non-volatile memories comprises a plurality of sectors in locations having a sequential order, wherein there is a predetermined number of non-volatile memories in the set of non-volatile memories having a predetermined order beginning with a first non-volatile memory and ending with a last non-volatile memory, comprising: memory means for receiving data from the main memory; memory controller means for receiving a command to write the data to the set of non-volatile memories; identifying means for identifying within the data a grouping of the data that is for writing to sectors in the set of non-volatile memories in which each non-volatile memory of the set of non-volatile memories is to be written and each sector to be written has a corresponding location to be written in all of the other non-volatile memories, wherein corresponding locations are locations that are in the same location in the sequential order; and writing means for writing the grouping of data into the set of the of non-volatile memories to result in the writing in the non-volatile memories occurring contemporaneously. The identifying means may be further characterized as being for determining if there is a portion of data for writing into the first non-volatile memory. The identifying means may be further characterized as being for excluding, from the grouping of the data, data that is for writing into a certain location in the first non-volatile memory in which the corresponding location to the certain location is not to be written in a different non-volatile memory of the set of non-volatile memories from the first non-volatile memory. The identifying means may be further characterized as being for excluding a separated portion of data from the grouping of data. The writing means may be further characterized as being for writing of the separated portion at a time exclusive from at time of the writing the grouping of data.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

FIG. 1 illustrates, in block diagram form, a data processing system 10 in accordance with an embodiment. Data processing system 10 includes data processor 12, dynamic random access memory (DRAM) 22, DRAM controller 18, bus 24, and a set of NAND flash memory chips 26, 32, 38, and 44. Data processor 12 includes processor 14 and NAND flash controller 16. Processor 14 can be any type of processor or plurality of processors having various peripheral circuitry and memory as needed for implementing a particular application, such as for example, an MP3 player, or the like. Moreover, the type of processor or application is not important for purposes of describing the invention and will not be discussed further. NAND flash controller 16 includes a buffer memory 20. In one embodiment, buffer memory 20 includes static random access memory (SRAM cells). In another embodiment, buffer memory 20 is a first in, first out (FIFO) memory. DRAM 22 is bi-directionally coupled to DRAM controller 18. For discussion purposes, DRAM 22 is considered a main memory. A control unit, such as for example, processor 14, controls the transfer of data between DRAM controller 18 and NAND flash controller 16. Buffer memory 20 is bi-directionally coupled to bus 24. In the illustrated embodiment, bus 24 is provided specifically for accessing NAND flash memory chips 26, 32, 38, and 44. In other embodiments, bus 24 may be coupled to other circuits as well. Also, in other embodiments, data processing system 10 may include any number of NAND flash memory chips. In addition, in another embodiment, DRAM 22 may be another memory type that uses a different mechanism to transfer data.

NAND flash controller 16 controls read and write accesses to NAND flash memory chips 26, 32, 38, and 44 in response to read and write commands and control information from processor 14. In one embodiment, processor 14 may include a software driver for controlling the operation of NAND flash controller 16. To write to one or more of memory chips 26, 32, 38, and 44, a write command issued from processor 14 will cause data to be transferred from a location in, for example, DRAM 22 to buffer 20 of NAND flash memory controller 16 by processor 14. From buffer 20, the data will be transferred via bus 24 to a buffer 30, 36, 42, or 48 of the addressed NAND flash memory chip. The write command provides a starting address and a number of pages to be written. The pages are written to the NAND flash memory chips in a predetermined sequential order. One sequential order is to write one page in each NAND flash memory chip as determined by the page numbering. A read operation is essentially the reverse of a write operation. A read command will cause data to be transferred from a location in one or more of the NAND flash memory chips to a location in DRAM 22 via one of more of NAND flash internal buffers 30, 36, 42, and 48, bus 24, and via buffer 20 of NAND flash controller 16.

Each of NAND flash memory arrays 28, 34, 40, and 46 are organized as pages, or sectors, of memory cells. Note that the terms page and sector will be used interchangeably herein. In system 10, the amount of time it takes to write a page to one of the NAND flash memory arrays from DRAM 22 may be viewed as comprising two parts. One part is the data transfer time from DRAM 22 to one of the NAND flash memory internal buffers 30, 36, 42, and 48. The other part is the time it takes to program a page of NAND flash memory cells. Generally, the data transfer time is much shorter than the program time of the NAND flash page. Because bus 24 is shared between the four NAND flash memory chips, data can only be transferred to one chip at a time on bus 24. To speed up accesses to the NAND flash memory chips when multiple pages are accessed, the accesses to multiple NAND flash chips can be "interleaved". For example, when multiple pages are accessed in response to a write command to NAND flash memory, data is transferred from DRAM 22 to the NAND flash internal buffer at the same time as, or contemporaneously with, data that is being programmed from the NAND flash internal buffer to the NAND flash memory array. This can be done because each NAND flash memory has its own buffer, so the programming operation is completely internal to the NAND flash memory once the data has been transferred over bus 24 to the NAND flash memory internal buffer. Interleaving data between the NAND flash chips allows the busy time of the plurality of NAND flash chips during a programming operation or read operation to overlap as much as possible. Overlapping the relatively lengthy programming operations during a write operation can save a significant amount of time.

However, in some systems, overlapping, or interleaving, the programming operations of multiple NAND flash memory chips can be difficult because of, for example, hardware or software constraints on the size of a page in a NAND flash memory array. Also, not all read or write operations can be interleaved. A read or write command has the format $C(A, N)$, where A indicates the starting page address of the NAND flash and N is the number of pages to be accessed. For purposes of applying the present method, the read and write commands are each categorized into three types: a perfect command $C_P(A,N)$, a valid command $C_V(A,N)$, and an invalid command $C_I(A,N)$. A perfect command $C_P(A,N)$ is a command where both A and N can be divided evenly by K with no remainder, where K is equal to the number of NAND flash memory chips, and address A is a starting address to a location in the first NAND flash memory chip. In the embodiment illustrated in FIG. 1, K is equal to four because there are four NAND flash chips 26, 32, 38, and 44. In other embodiments, there can be any number of NAND flash chips. A valid command $C_V(A,N)$ is a command which is not a perfect command $C_P(A,N)$, but has at least one page of N pages belonging to the first NAND flash memory chip of a system. An invalid command $C_I(A,N)$ is a command that is neither perfect nor valid. The command is invalid if no portion of the data is written to a page of the first NAND flash memory chip. In a series of data transfer commands, if a previous command is a valid command and can be re-organized with an invalid command, then the invalid command is still eligible for command reorganization. If an invalid command is the first command in a series of new read or write commands, or the command before the invalid command is a perfect command, data from the invalid command is not reorganized for interleaving and is written serially, or in a partially interleaved way. For discussion purposes, NAND flash memory chip 26 of FIG. 1 will be designated the "first" NAND flash memory chip for purposes of establishing a starting address. The second, third, and fourth chips will be NAND flash memory chips 32, 38, and 44, respectively. In other embodiments, there can be a different ordering of NAND flash memory chips 26, 32, 38, and 44.

Figure 2:
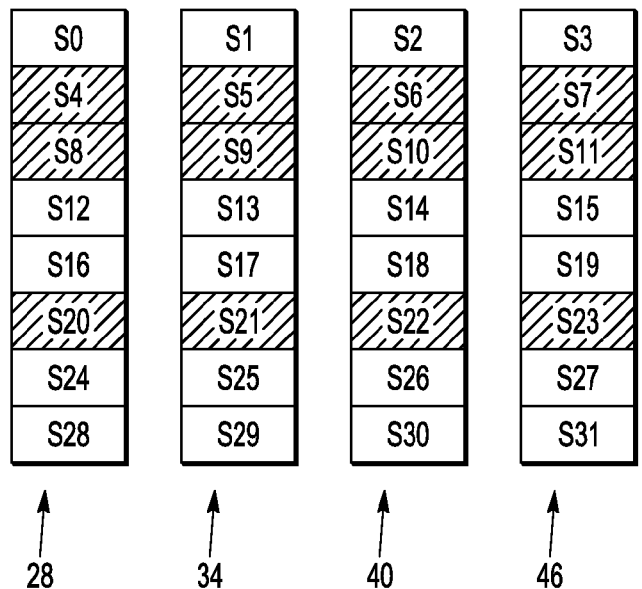
FIG. 2 illustrates examples of perfect commands in the NAND flash memories of FIG. 1.

FIG. 2 illustrates two examples of perfect commands in the NAND flash memory arrays 28, 34, 40, and 46 of FIG. 1. Each of memory arrays 28, 34, 40, and 46 includes a plurality of pages. Each of the pages is identified by a page address. The pages are identified in the ordered they are accessed for an interleaving operation. For example, memory array 28 is the first memory array and includes pages S0, S4, S8, S12, S16, S20, S24, and S28. By way of example, a perfect command $C_P(S4, 8)$ has page S4 as the starting page, and the number of pages to be accessed is 8. Perfect command $C_P(S4, 8)$ can be either a read or write command. The interleaving access of this command is illustrated in FIG. 2 by cross-hatched pages S4-S11. This is a perfect command because both starting address A=S4 and number of pages N=8 are divisible by 4 with no remainder, and the starting page is in first NAND flash memory array 28. Another example of a perfect command is $C_P(S20, 4)$, where S20 is the starting address and N=4 is the number of pages to be accessed. As can be seen from the examples, a perfect command is a command that naturally matches the interleaving requirements and no reorganization of the command is necessary for interleaving.

Figure 3:
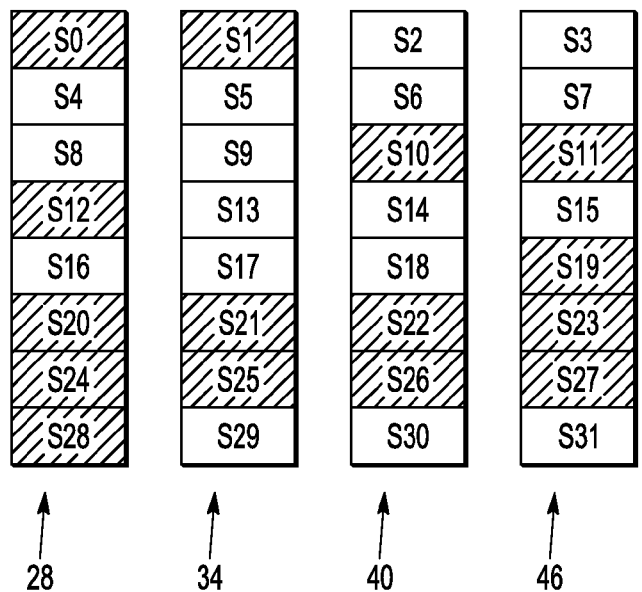
FIG. 3 illustrates examples of valid commands in the NAND flash memories of FIG. 1.

FIG. 3 illustrates three examples of valid commands in the NAND flash memories 28, 34, 40, and 46 of FIG. 1. Example cross-hatched commands $C_V(S0, 2)$, $C_V(S10, 3)$, and $C_V(S19, 10)$ are valid commands because in every case at least one page accessed by the command is on the first NAND flash memory chip 28 and the starting address A and the number of pages N are not divisible by 4 (number of chips) without a remainder. A "valid" command is eligible for command reorganization to allow interleaving in accordance with the illustrated embodiment.

Figure 4:
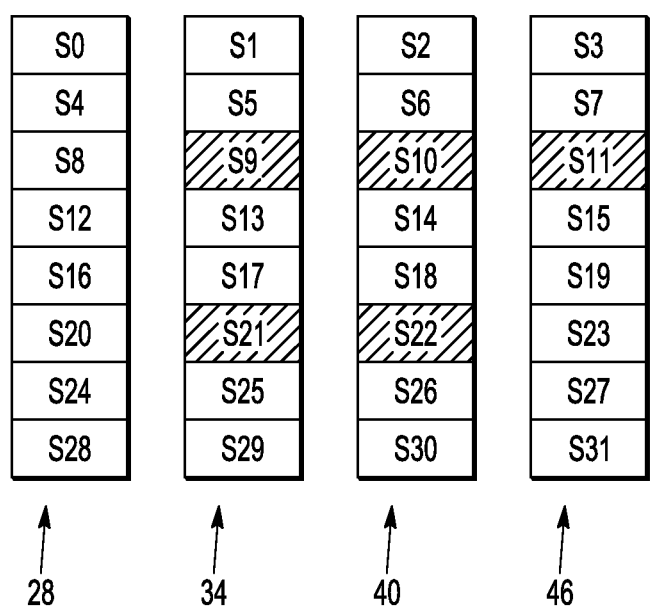
FIG. 4 illustrates examples of invalid commands in the NAND flash memories of FIG. 1.

FIG. 4 illustrates two examples of invalid commands in the NAND flash memories 28, 34, 40, and 46 of FIG. 1. Commands $C_I(S9, 3)$ and $C_I(S21, 2)$ are invalid commands because no pages in the first NAND flash memory array 28 are addressed. Note that the term "invalid" means the command, as a starting command, is ineligible for command reorganization in accordance with the illustrated embodiment. The addressed pages are accessed serially instead of being interleaved. However, the invalid command may be eligible for command reorganization if a valid command is presented before the invalid command, and the valid command can be re-organized with the invalid command.

Figure 5:
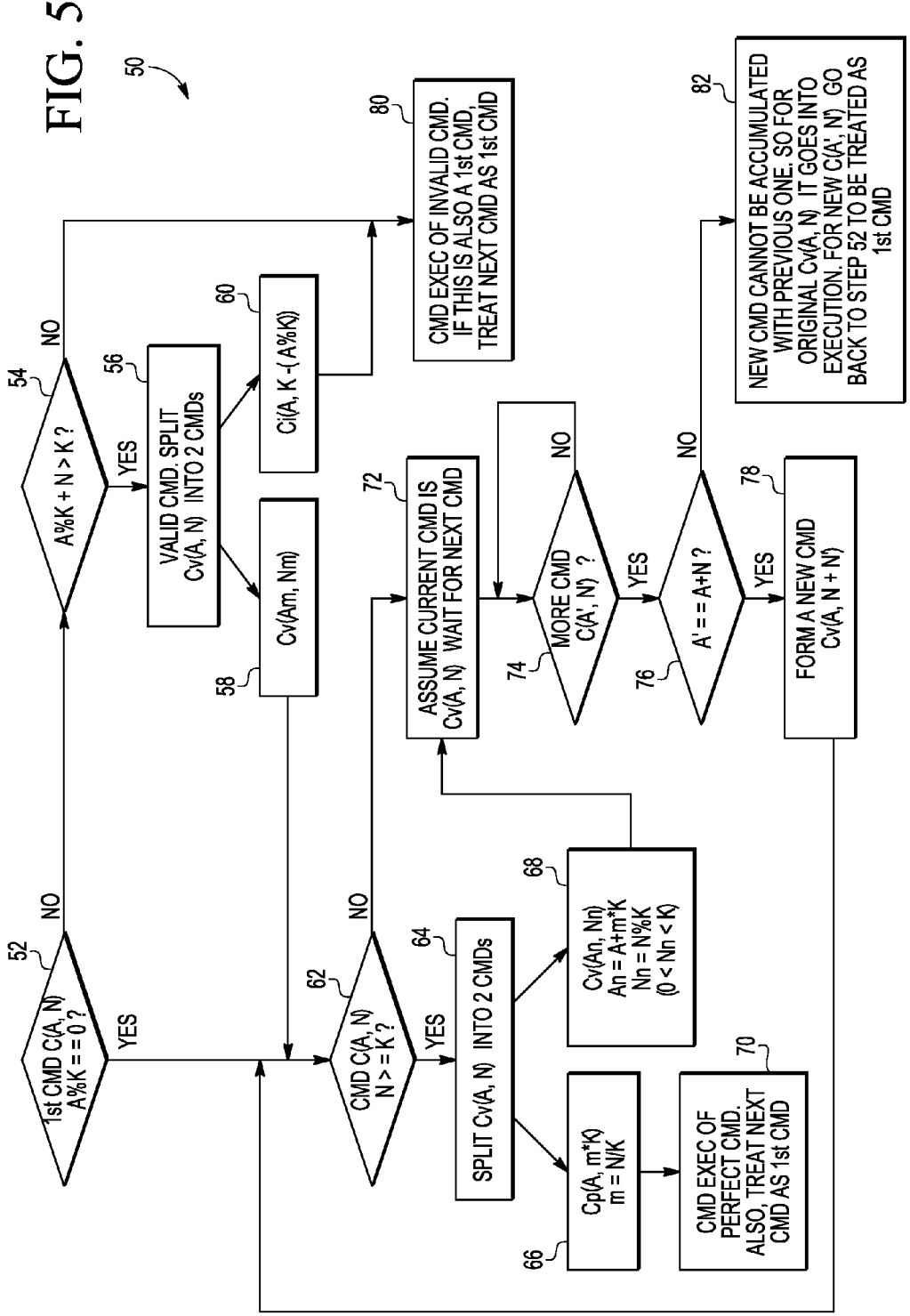
FIG. 5 illustrates a flowchart of write command reorganization in accordance with an embodiment.

FIG. 5 illustrates a flowchart of a method 50 for write command reorganization in accordance with an embodiment. In the flow chart, the letter A is the starting page address, the letter N is the number of pages to be accessed, and the letter K is the number of NAND flash memory chips in the system. A write command is generated to write a predetermined amount of data to NAND flash memory. In accordance with method 50, the command type is determined. If the command is a type that can be reorganized for interleaving, the method performs the reorganization. At decision step 52, it is determined if the write command is at the starting boundary for interleaving, that is, it is determined if the starting address is directed to a page in first NAND flash memory array 28. This is determined by checking if starting address A can be divided by the number of NAND flash memory chips K without a remainder. If there is not a remainder, the YES path is taken to step 62. This command is at least a valid command and is therefore eligible for command reorganization. At step 62, the command is checked to see if the number of pages N is greater than or equal to K. If the number of pages is greater than or equal to K, the YES path is taken to step 64. At step 64, the command is reorganized by being split into two commands, one perfect command, at step 66, and one valid command at step 68. At step 68, this command is a valid command because address A starts at the first NAND flash chip 28. If the number of remaining pages Nn from the reorganization at step 66 can be divided by number of chips K with no remainders, than only $C_P(A, m*K)$ is needed and step 68 is not performed. Therefore, Nn must be greater than zero and less than K. At step 70, interleaving is used in the execution of this perfect command to take advantage of hardware interleaving support. The next command is then provided at step 52.

Referring back to step 68, the valid command will be held for accumulation by waiting for the next command. Command accumulation means a received command and associated data are stored to a temporary buffer instead of being executed immediately. An acknowledgment is returned to the processor to allow the writing process to continue. At decision step 74, the method waits until the next command is received. The command is pushed into execution by setting a time out value and checking if the time out value is reached. At decision step 76, a new command arrives. At step 76, the new command is checked to see if the new command's starting page immediately follows the previous command's ending page. If yes, the new command can be appended to the accumulated command to produce a new valid command (at step 78) and the method flow proceeds back to the beginning of step 62. If the new command cannot be accumulated with the previous command because the starting address does not immediately follow the starting address of the previous command, the NO path is taken to step 82 and the new command is executed as a new first command and the flow returns to beginning step 52.

Referring back to decision step 52, if the command being checked has a remainder, the NO path is taken from step 52 to decision step 54. At decision step 54, it is determined if N+the remainder of address A divided by K is greater than K. If not, the NO path is taken to step 80. At step 80, the NAND write operation is executed immediately but without interleaving. If N+the remainder of address A divided by K is greater than K, the YES path is taken to step 56. At step 56, the command is determined to be a valid command that does not start at the first NAND flash memory chip 28. The command is split into two commands. At step 60, one of the new commands will be an invalid command Ci(A, K−(A%K)). The number of pages in this command is from the beginning address to the end of the NAND interleaving boundary. Following step 60, the command is executed immediately without interleaving at step 80. At step 58, the other new command is generated. The other new command must start from the NAND interleaving boundary. It is a valid command with the number of pages Nm being from the original write command. The flow then proceeds to step 62 and the necessary subsequent steps are performed as discussed above to determine if the new command can be reorganized. Note that method 50 is just one way to implement command reorganization for a write command.

Figure 6:
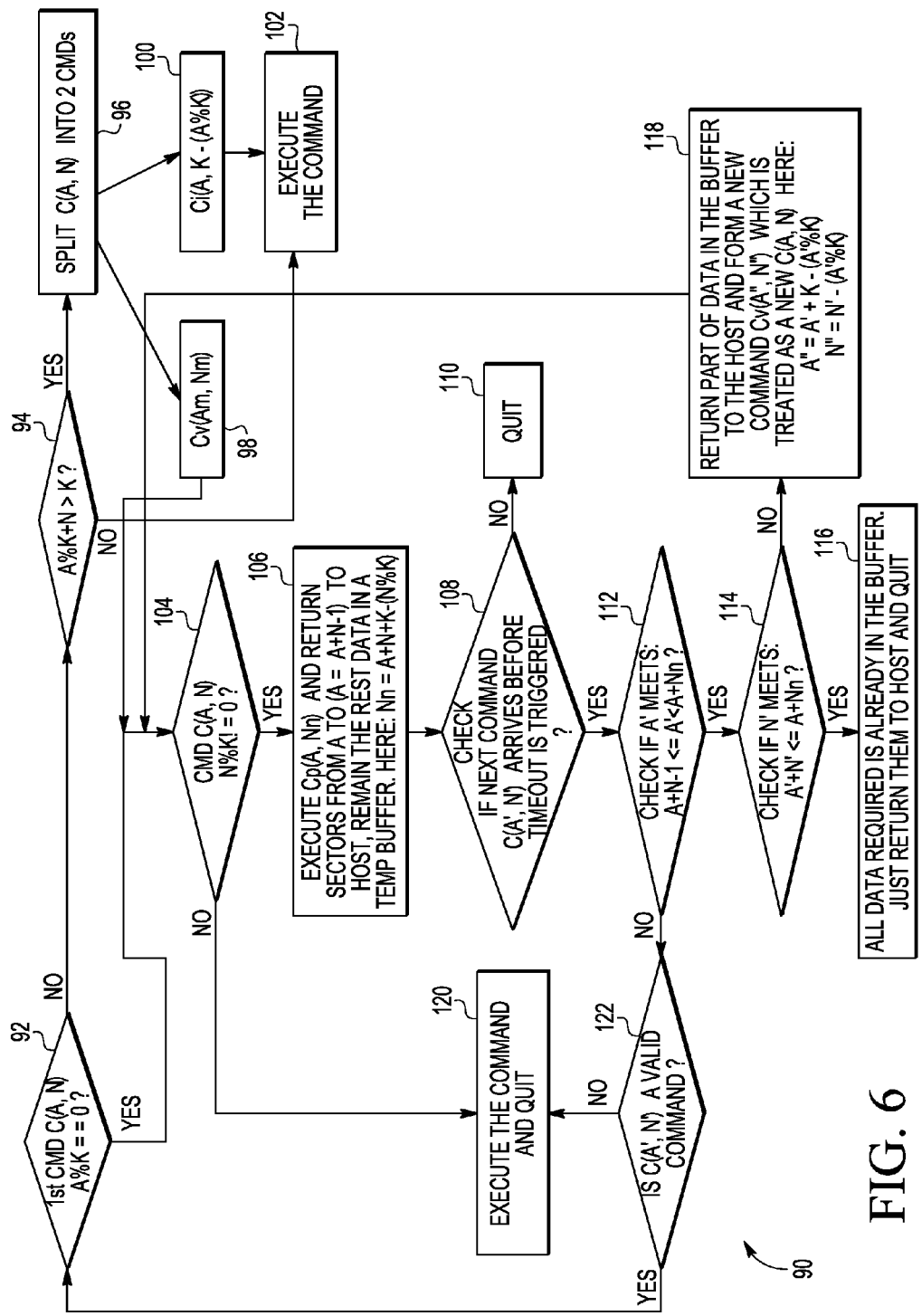
FIG. 6 illustrates a flowchart of read command reorganization in accordance with an embodiment.

FIG. 6 illustrates a flowchart of a method 90 for read command reorganization in accordance with an embodiment. In the flow chart, A is the starting page address, N is the number of pages to be accessed, and K is the number of NAND flash memory chips in the system. At step 92, it is determined if the read command is at the starting boundary for interleaving, that is, it is determined if the starting address is directed to a page in first NAND flash memory array 28. This is determined by checking if the starting address A can be divided by the number of NAND flash memory chips K without a remainder. If there is not a remainder, the YES path is taken to step 104. At decision step 104, it is determined if N is an integer multiple of K. This is done to determine if the command is a perfect command. If N is an integer multiple of K, the NO path is taken to step 120. At step 120 the command is executed as a perfect command. If, at decision step 104, N is not an integer multiple of K, the YES path is taken to step 106. At step 106, a new command is generated. The new command is a perfect command which after execution, reads (K—the remainder of N divided by K) extra pages of data as compared to the original command. The new command is executed. The remainder of the extra data is stored, or accumulated until a next new command arrives or until a time out period has expired. At step 108, wait for next command. If no new command arrives before the time out period, the NO path is taken to step 110 and execution ends with the extra data being dropped. If a next new command C(A', N') arrives, at step 112, it is determined if the new address A' is greater than or equal to A+N−1 and less than A+Nn. If not, then the NO path is taken from step 112 to step 122. If the answer at step 112 is yes, the YES path is taken to step 114. At decision step 114, it is determined if new number of pages N' meets the expression A'+N' is less than or equal to A+Nn. If no, the NO path is taken to step 118. At step 118, some data in the temporary buffer from step 106 is returned. In addition, a new command is formed and the execution is returned to the beginning of step 104 and treated as a new next command. If the YES path is taken from step 114 to step 116, at step 116, the requested data has been read in step 106 and stored in a temporary buffer. The data is returned from the temporary buffer.

Referring back to step 92, it is determined that the starting address is directed to a page in first NAND flash memory array 28. This is determined by checking if the starting address A can be divided by the number of NAND flash memory chips K without a remainder. If the answer is no, the NO path is taken to step 94. At step 94, it is determined if N+the remainder of A divided by K is greater than K. If not the NO path is taken to step 102, and the command is executed as an invalid command. If the YES path is taken from step 94 to step 96, the command is split into two commands. At step 98 a valid command is formed and the method proceeds to step 104. At step 100, a new invalid command is formed. At step 102, the new invalid command is executed. Note that method 90 is just one way to implement command reorganization of a read operation of NAND flash memory.

Figure 7:
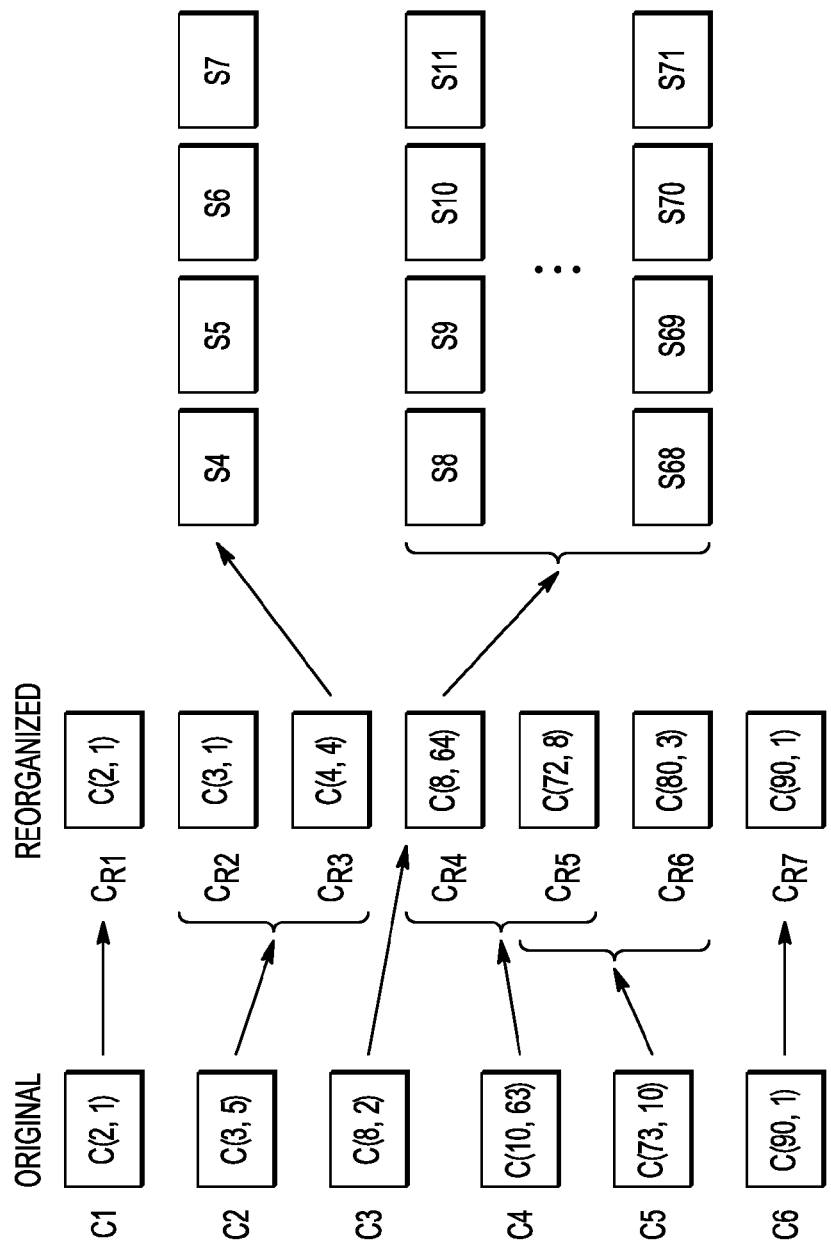
FIG. 7 illustrates an example of command reorganization in accordance with an embodiment.

FIG. 7 illustrates an example of command reorganization in accordance with method 50 of FIG. 5. The example of FIG. 7 assumes the number of NAND flash memory chips K is 4, as in the previous examples. Note that in other embodiments, there can be any number of NAND flash memory chips in a system. In FIG. 7, a series of original commands labeled C1-C6 are reorganized into a series of reorganized commands CR1-CR7. As can be seen in FIG. 7, command C1 is an invalid command because A is 2 which is not an integer multiple of K, and also because N is equal to 1 and therefore command C1 cannot be reorganized. Command C1 is executed without interleaving. Command C2 is reorganized into commands CR2 and CR3. Also, command C4 is reorganized into new commands CR4 and CR5. In addition command C5 is reorganized into new commands CR5 and CR6. Like command C1, command C6 cannot be reorganized. By way of illustration, reorganized command CR3 would interleave write data to pages S4-S7. Also, reorganized command CR4 would interleave write data to pages S8-S71.

The above discussion regarding interleaving read and write data operations assumes that each of the NAND flash memory arrays will be accessed during interleaving operations. One of skill in the art will understand that partial interleaving is also feasible. In a partial interleaving operation, not all of the NAND flash memories are read or written concurrently, and it is also not necessary to require the first NAND flash memory to be involved. For example, an invalid command (for example, C(1,3)) can be partially executed by interleaving. That is to say, even an invalid command can still benefit from interleaving. Although not fully discussed, partial interleaving is considered complementary to the described embodiments.

Because programming a flash memory requires significantly more time than reading from a flash memory, more time savings can be realized by reorganizing write commands to facilitate interleaving. However, a system may reorganize both write commands and read commands, just write commands, or just read commands.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. For example, the processor may be a microprocessor, microcontroller, digital signal processor, or a plurality of processors. Those skilled in the art will recognize that the boundaries between logic blocks are merely illustrative and that alternative embodiments may merge logic blocks or circuit elements or impose an alternate decomposition of functionality upon various logic blocks or circuit elements.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a system having a memory controller for accessing a main memory and a set of non-volatile memories, wherein each non-volatile memory of the set of non-volatile memories comprises a plurality of sectors in locations having a sequential order, wherein there is a predetermined number, K, of non-volatile memories in the set of non-volatile memories having a predetermined order beginning with a first non-volatile memory and ending with a last non-volatile memory, a method of operating the memory controller, comprising:
   receiving a first command to write data from the main memory to the set of non-volatile memories, wherein the first command indicates a total number of sectors, N, into which the data is to be written;
   when N is greater than K, and N is not an integer multiple of K,
      identifying within the data a first grouping of the data that includes data corresponding to an integer multiple of K sectors,
      identifying within the data a second grouping of remaining data that includes data not included in the first grouping of the data, and
      generating a second command and at least one additional command from the first command, wherein the second command is to write the first grouping of data, and the at least one additional command is to write the second grouping of data;
   executing the second command by writing the first grouping of data contemporaneously to sectors in each non-volatile memory of the set of non-volatile memories; and
   executing the at least one additional command by writing the second grouping of data into the set of the non-volatile memories.

2. The method of claim 1 wherein the step of identifying within the data the first grouping of data comprises determining if there is a portion of data for writing into the first non-volatile memory.

3. The method of claim 1, further comprising executing the at least one additional command a time exclusive from a time of executing the second command.

4. The method of claim 1, wherein at least part of the remaining data is written to at least one sector having a location prior in sequence to the sectors into which the first grouping of data is written.

5. The method of claim 1, wherein at least part of the remaining data is written to at least one sector having a location subsequent in sequence to the sectors into which the first grouping of data is written.

6. The method of claim 1, wherein the step of identifying the first grouping of the data comprises:
   determining if a beginning of the data to be written is for writing into the first non-volatile memory; and
   if the beginning of the data to be written is for writing into the first non-volatile memory, determining if the number of different sectors to be written is greater than or equal to the number of non-volatile memories in the set of non-volatile memories;
   wherein, if the number of different sectors to be written is an integer multiple of the number of non-volatile memories in the set of non-volatile memories, then the data is the first grouping of data.

7. The method of claim 6, wherein the step of identifying the second grouping of the remaining data further comprises:
   if the number of different sectors to be written exceeds an integer multiple of the number of non-volatile memories in the set of non-volatile memories by an amount less than the number of non-volatile memories, then identifying the portion of the data that exceeds the integer multiple as belonging to the second grouping of data.

8. The method of claim 7, wherein the step of identifying the first grouping of data further comprises:

if the beginning of the data to be written is not for writing into the first non-volatile memory, determining that any of the data to be written is to be written into the first non-volatile memory; and if any of the data to be written is to be written into the first non-volatile memory, determining that the data to be written into the first non-volatile memory is at a location in which all of the non-volatile memories are to be written; and if the data to be written in the first non-volatile memory is not at a location in which all of the non-volatile memories are to be written, waiting, not exceeding a predetermined time, for a command to write additional data to the set of non-volatile memories before executing the at least one additional command.

9. A method for accessing a number, K, of non-volatile memories, each of the non-volatile memories having a plurality of sectors, the method comprising:

receiving a first command to access the plurality of non-volatile memories for a data transfer of a predetermined number, N, of sectors;

determining whether N is an integer multiple of K;

when N is not an integer multiple of K and N is greater than K, reorganizing the first command into a second and at least one additional command, wherein execution of the second command will result in the data transfer of an integer multiple of K first sectors of the predetermined number, N, of sectors to or from the plurality of non-volatile memories concurrently in parallel, and execution of the at least one additional command will result in the data transfer of remaining sectors not included in the first sectors; and executing the second command and the at least one additional command.

10. The method of claim 9, further comprising determining that the predetermined number of sectors is greater than or equal to the number, K, of non-volatile memories in the plurality of non-volatile memories.

11. The method of claim 9, wherein receiving the first command to access the plurality of non-volatile memories for the data transfer further comprises the data transfer being a write operation of the plurality of non-volatile memories.

12. The method of claim 9, wherein the at least one additional command includes a third command, and execution of the third command will result in the data transfer of data into one or more sectors in locations prior in sequence or subsequent in sequence to the first sectors.

13. The method of claim 12, wherein the at least one additional command includes the third command and a fourth command, wherein execution of the third command will result in the data transfer of data into one or more sectors in locations prior in sequence to the first sectors, and execution of the fourth command will result in the data transfer of data into one or more sectors in locations subsequent in sequence to the first sectors.

14. A memory control system for use in a system having a main memory and a set of non-volatile memories, wherein each non-volatile memory of the set of non-volatile memories comprises a plurality of sectors in locations having a sequential order, wherein there is a predetermined number, K, of non-volatile memories in the set of non-volatile memories having a predetermined order beginning with a first non-volatile memory and ending with a last non-volatile memory, comprising:

memory means for receiving data from the main memory;

memory controller means for receiving a first command to write the data to the set of non-volatile memories, wherein the first command indicates a total number of sectors, N, into which the data is to be written;

identifying means for identifying, when N is greater than K, and N is not an integer multiple of K, a first grouping of the data that includes data corresponding to an integer multiple of K sectors, and identifying within the data a second grouping of remaining data that includes data not included in the first grouping of the data;

reorganizing means for reorganizing the first command into a second command and at least one additional command, wherein the second command is to write the first grouping of data, and the at least one additional command is to write the second grouping of data; and writing means for executing the second command by writing the first grouping of data contemporaneously to sectors in each non-volatile memory of the set of non-volatile memories, and for executing the at least one additional command by writing the second grouping of data into the set of the non-volatile memories.

15. The memory control system of claim 14, wherein the identifying means is further characterized as being for determining if there is a portion of data for writing into the first non-volatile memory.

16. The memory controller of claim 14, wherein the writing means is further characterized as being for executing the at least one additional command at a time exclusive from at time of executing the second command.

17. The method of claim 1, further comprising:

when N is less than K, executing the first command by writing the data sequentially to sectors in the set of non-volatile memories.

18. The method of claim 1, further comprising:

when N is an integer multiple of K, executing the first command by writing the data contemporaneously to sectors in each non-volatile memory of the set of non-volatile memories.

19. The method of claim 18, further comprising:

determining whether a first sector identified in the first command corresponds to a starting boundary for interleaving.

20. The method of claim 19, wherein determining whether the first sector corresponds to the starting boundary for interleaving comprises:

determining whether the first sector corresponds to a sector in the first non-volatile memory.

\* \* \* \* \*